Feb. 16, 1954 R. LAPSLEY 2,669,132
DRIVE MEANS
Filed April 18, 1952
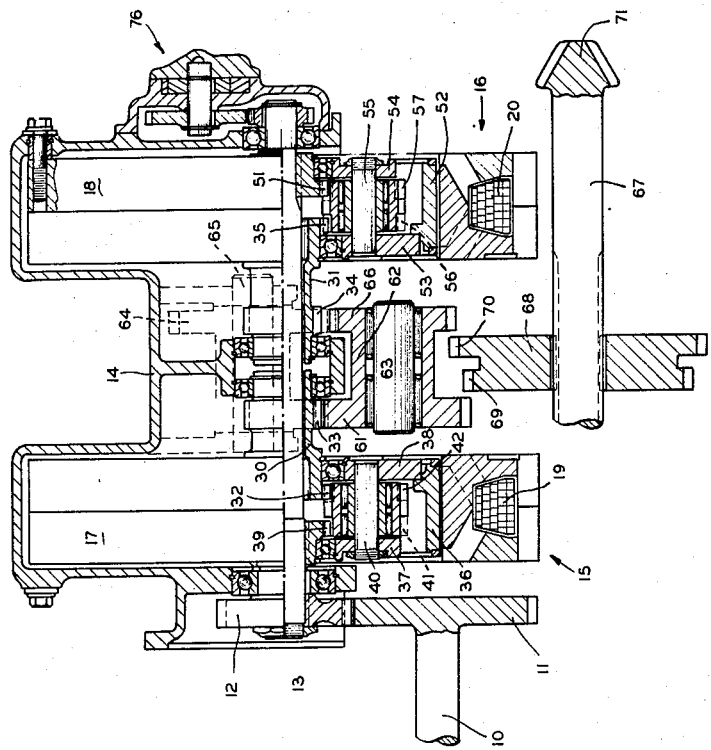
INVENTOR.
ROBERT LAPSLEY
BY
ATTYS.

Patented Feb. 16, 1954

2,669,132

UNITED STATES PATENT OFFICE 2,669,132

DRIVE MEANS

Robert Lapsley, Buchanan, Mich., assignor to Clark Equipment Company, Buchanan, Mich., a corporation of Michigan Application April 18, 1952, Serial No. 283,059

9 Claims. (Cl. 74—770)

1

My present invention relates generally to drive means, and, more specifically, is directed to a transmission.

Conventional drive means of the general character to which my present invention relates comprises a pair of rotatable flywheel casings each of which carries an enclosed magnetic core or field winding. The flywheel casings are driven conjointly by the crankshaft of a prime mover. Associated with the flywheel casings are annular pole pieces which are each secured to a separate drive shaft or sleeve member. Suitable change speed gear means is provided between the drive shafts and an output shaft. When it is desired to transmit torque between one of the flywheel casings and the adjacent pole piece, the associated magnetic core is electrically energized. Upon energization of the core, an eddy current is set up within the flywheel casing which tends to attract the pole piece for conjoint rotation therewith.

The gear means between the drive shafts and the output shaft is so arranged that forward drive is selectively effected by electrically energizing one of the magnetic cores and reverse drive is effected by selectively electrically energizing the other of the magnetic cores. The desired speed ratio in either forward or reverse drive is selected by means of a manually shiftable clutch collar member associated with the change speed gear means. Electrical connection to the rotating magnetic cores is effected by means of brushes and collector rings.

In the combination electrodynamic clutch and transmission unit described above, the amount of current introduced into the desired magnetic core affects control of the magnetic field between the flywheel casing and the adjacent pole piece, thus determining the amount of slippage that will take place between the rotating elements. For the proper operation of the above described assembly, it is necessary to maintain a very small and uniform air gap between the flywheel casings and the associated pole pieces. Since the rotating flywheel casings are quite heavy, in that they carry the magnetic cores, it is quite difficult to maintain the desired clearances in the commercial embodiments of the described drive means.

It is an object of my present invention to provide a transmission unit embodying novel electrodynamic brake means by virtue of which either forward or reverse drive may be selectively effected in any one of a plurality of drive ratios.

It is another object of my present invention

2 to provide a transmission unit, as noted, wherein the electrodynamic brake means comprises stationary flywheel casings which carry magnetic cores.

By virtue of the above construction, brushes and collector rings are eliminated. A further feature of my present invention resides in the formation of a stationary housing comprising the flywheel casings into which housing cooling oil may be circulated for cooling the magnetic cores therein.

It is to be further noted that by maintaining the flywheel casings stationary, rotation of the heavy masses of these elements is eliminated thereby simplifying the task of both maintaining alignment between the rotating elements and maintaining the proper air gaps between the flywheel casings and the adjacent pole pieces.

It is a still further object of my present invention to provide step-up gearing between the prime mover and the input shaft of the transmission unit so that the rotating elements run at a higher speed than the prime mover. In accordance with this object, the torque at the input shaft is less than the torque developed by the prime mover. By reducing the torque, which must be transmitted through the rotating elements of my present invention, both the size and weight of the elements may be reduced thereby producing a unit which is more compact than presently known equivalent combination electrodynamic clutch and transmission units.

Now, in order to acquaint those skilled in the art with the manner of constructing and using the devices of my present invention, I shall describe in connection with the accompanying drawing, a preferred embodiment of my present invention.

In the drawing:

The single figure is a sectional view of the drive means of my present invention taken substantially along a vertical plane passing through the longitudinal axis of the drive means.

Referring now to the drawing, there is indicated at 10 the crankshaft of a prime mover, which may, for example, comprise an internal combustion engine. Drivingly connected to the rear end of the engine crankshaft 10 is a drive gear 11 which has meshing engagement with a driven gear 12. The gear 12 is secured to a shaft 13 which lies parallel to the engine crankshaft 10 vertically thereabove. The pitch diameter of the gear 12 is less than the pitch diameter of the gear 11, and, in the preferred embodiment of my present invention, the ratio of the pitch diameters is 1 to 2. Thus, in the preferred embodiment of my present invention, the shaft 13 rotates at twice the speed as the engine crankshaft 10. It is also to be noted that the torque at the shaft 13 is one-half the torque developed by the prime mover. This feature of the present invention is of particular importance and will be described more fully hereinafter.

The shaft 13 extends rearwardly into a stationary transmission housing 14 in which are mounted a pair of electrodynamic brake means indicated generally by the reference numerals 15 and 16. The brake means 15 and 16 respectively, comprise casing members 17 and 18 which are suitably secured to the stationary housing 14. Enclosed within the casings 17 and 18 are magnetic cores or field windings 19 and 20, which, through suitable electrical cables, are adapted to be selectively connected with a source of electrical energy.

Journaled on the shaft 13, centrally of the ends thereof, are a pair of sleeve members 30 and 31. Secured to the sleeve member 30 are a pair of axially spaced gears 32 and 33 and secured to the sleeve member 31 are a pair of axially spaced gears 34 and 35. The end gears 32 and 35 are associated respectively with brake means 15 and 16 and serve as output gears of planetary gear means to be described hereinafter. A gear 39, which serves as a sun gear, is secured to the shaft 13 intermediate of the gears 12 and 32.

The brake means 15 comprises a rotor or pole piece 36 having radial end flange portions 37 and 38. The rotor 36 is of substantially U-shaped configuration in cross section and serves as a planet carrier in a manner to be fully described hereinafter. The radial flange 37 of the rotor 36 is journaled on the shaft 13 intermediate of the gears 12 and 39 and the radial flange portion 38 of the rotor 36 is journaled on the sleeve member 30 intermediate of the gears 32 and 33. The rotor 36 is, thus, normally freely rotatable relative to the shaft 13 and the sleeve member 30.

A plurality of circumferentially spaced shafts 40 are secured at their ends in the radial flanges 37 and 38 of the rotor 36. Journaled on one set of alternate shafts 40 are planet pinions 41 which have meshing engagement with the aforedescribed sun gear 39. Journaled on the other set of alternate shafts 40 are planet pinions 42 which have meshing engagement with the planet pinions 41 and the output gear 32. The gears 32 and 39 preferably have the same pitch diameter and the pinions 41 and 42 preferably have the same pitch diameter.

Now, even though the shaft 13 is rotated, if the magnetic core 19 remains electrically unenergized, no torque will be transmitted between the shaft 13 and the sleeve member 30 because the pinions 41 will ride freely around the sun gear 39. However, when the magnetic core 19 is electrically energized, and a magnetic field is established, the rotor or planet carrier 36 will be magnetically attracted to the stationary casing 17 and will be held against rotation relative thereto. When the rotor 36 is held stationary and the shaft 13 and the sun gear 39 are rotated, the planet pinions 41 and 42 will be caused to rotate about the shafts 40 thus driving the output gear 32 and the sleeve member 30. Under the last described condition of operation, the sleeve member 30 will be rotated at the same speed as the shaft 13 but in an opposite direction.

Secured to the shaft 13, adjacent the rear end thereof, is a gear 51 which is associated with the brake means 16 and serves as a sun gear. The brake means 16 comprises a rotor or pole piece 52 having radial end flange portions 53 and 54. The rotor 52, like the rotor 36, is of substantially U-shaped configuration in cross section and serves as a planet carrier. The radial flange portion 53 of the rotor 52 is journaled on the sleeve member 31 intermediate of the gears 34 and 35. The flange portion 54 of the rotor 52 is journaled on the shaft 13 rearwardly of the sun gear 51. A plurality of circumferentially spaced shafts 55 are secured at their ends in the radial flange portions 53 and 54. Journaled on one set of alternate shafts 55 are planet pinions 56 which have meshing engagement with the output gear 35 secured to the sleeve member 31. Journaled on the other set of alternate shafts 55 are planet pinions 57 which have meshing engagement with the sun gear 51 and the planet pinions 56. The planet pinions 56 and 57 preferably have the same pitch diameter and the gears 51 and 35 preferably have the same pitch diameter.

When the magnetic core 20 is electrically energized and the planet carrier 52 is held against rotation, the sleeve member 31 will rotate at the same speed as the shaft 13 but in an opposite direction. When the magnetic core 20 is de-energized, the planet carrier 52 is free to rotate and, thus, when the shaft 13 is rotated, the planet pinions 57 will ride freely around the sun gear 51. Under the last described condition of operation, no torque will be transmitted between the shaft 13 and the sleeve member 31.

The aforedescribed gear 33, secured to the sleeve member 30 has constant meshing engagement with the gear portion 61 of a compound gear member 62 journaled on a countershaft 63. The aforedescribed gear 34, secured to the sleeve member 31, has constant meshing engagement with a reverse idler gear 64 journaled on a lay shaft 65. The reverse idler gear 64 has constant meshing engagement with the gear portion 66 of the compound gear member 62. Mounted vertically below the shaft 13 is an output shaft 67. Secured to the end of the output shaft 67 is a bevel pinion 71 which is adapted to be disposed in meshing engagement with the bevel ring gear of a differential mechanism associated with the drive axles of a vehicle. Non-rotatably mounted on the output shaft 67, but axially movable therealong, is a compound gear member 68 which comprises gear portions 69 and 70. The gear portion 69 is adapted to be disposed selectively in meshing engagement with the gear portion 61 for effecting one drive ratio to the output shaft 67 and the gear portion 70 is adapted to be disposed selectively in engagement with the gear portion 66 for effecting a second drive ratio to the output shaft 67.

The operation of the drive means of my present invention is as follows:

When forward drive in low speed is desired, the compound gear member 68 is shifted to the right disposing gear portion 70 in engagement with gear portion 66 and the magnetic core 19 is electrically energized. Now, assuming that the engine crankshaft 10 is revolving, forward drive in low speed is established between the crankshaft 10 and the output shaft 67, through gear 11, gear 12, shaft 13, sun gear 39, planet pinions 41, planet pinions 42, output gear 32, sleeve member 30, gear 33, gear portion 61, gear portion 66, and gear portion 70. Now, if forward drive in high speed is desired, the compound gear member 68 is shifted to the left disposing the gear portion 69 in meshing engagement with gear portion 61. Drive is now established between the crankshaft 10 and the output shaft 67 through the gear 11, gear 12, shaft 13, sun gear 39, planet pinions 41, planet pinions 42, output gear 32, sleeve member 30, gear 33, gear portion 61, and gear portion 69.

If reverse drive in low speed is desired, the magnetic core 19 is de-energized and the magnetic core 20 is electrically energized. The compound gear member 68 is also shifted to the right. Drive is now established between the crankshaft 10 and the output shaft 67 through the gear 11, gear 12, shaft 13, sun gear 51, planet pinions 57, planet pinions 56, output gear 35, sleeve member 31, gear 34, reverse idler gear 64, gear portion 66, and gear portion 70. If reverse drive in high speed is desired, the compound gear member 68 is shifted to the left. Drive is now established between the crankshaft 10 and the output shaft 67 through the gear 11, gear 12, shaft 13, sun gear 51, planet pinions 57, planet pinions 56, output gear 35, sleeve member 31, gear 34, reverse idler gear 64, gear portion 66, gear portion 61, and gear portion 69.

It will thus be observed from the foregoing description that I have provided a combination electrodynamic brake and transmission unit through which either forward or reverse drive may be selectively effected in either one of two drive ratios. A change from drive in one direction to drive in the other direction may be smoothly effected by varying the amount of current introduced into the magnetic cores which, as will be understood by those skilled in art, determines the amount of slippage occurring between the casings and the rotors.

A fluid pump indicated generally by the reference numeral 76 is driven from the forward end of the shaft 13 and is provided for circulating cooling oil to the clutch means 15 and 16 within the housing 14.

Since, as pointed out above, step-up gearing, comprising the gears 11 and 12, is provided between the engine crankshaft 10 and the shaft 13 of the transmission, the speed of the shaft 13 is greater than the speed of the crankshaft 10 while the torque at the shaft 13 is less than the torque developed by the prime mover driving the crankshaft 10. A reduction in the torque at the shaft 13 permits a reduction in the size and weight of the brake means 15 and 16. It is to be further observed that since the casings 17 and 18, which enclose the magnetic cores 19 and 20, are secured to the stationary housing 14, the mass of rotating parts is reduced to a minimum, thereby minimizing the difficulties of maintaining the various rotating elements of the drive means of my present invention in precise alignment.

Now, while I have shown and described what I believe to be a preferred embodiment of my present invention, it will be understood that various modifications and rearrangements may be made therein without departing from the spirit and scope of my present invention.

I claim:

1. In a torque transmitting device, the combination of a drive shaft, a first sleeve member journaled on said drive shaft, a second sleeve member journaled on said drive shaft, first planet carrier means arranged concentrically about said drive shaft and said first sleeve member, first planetary gear means between said drive shaft and said first sleeve member, said first planetary gear means including planetary pinion means carried by said first planet carrier means, first selectively operable electrodynamic brake means for braking said first planet carrier means whereby drive is effected between said drive shaft and said first sleeve member, second planet carrier means arranged concentrically about said drive shaft and said second sleeve member, second planetary gear means between said drive shaft and said second sleeve member, said second planetary gear means including planet pinions carried by said second planet carrier means, second selectively operable electrodynamic brake means for braking said second planet carrier means whereby drive is effected between said drive shaft and said second sleeve member, a driven shaft, selectively operable change speed gear means between said first sleeve member and said driven shaft, and reverse gear means between said second sleeve member and said last-named change speed gear means.

2. In a torque transmitting device, the combination of a drive shaft, a first sleeve member journaled on said drive shaft, a second sleeve member journaled on said drive shaft, first planet carrier means arranged concentrically about said drive shaft and said first sleeve member, a first gear secured to said drive shaft, a second gear secured to said first sleeve member, first planet pinions meshing with said first gear, second planet pinions meshing with said first planet pinions and said second gear, said first and second planet pinions being carried by said first planet carrier means, first selectively operable electrodynamic brake means for braking said first planet carrier means whereby drive is effected between said drive shaft and said first sleeve member, second planet carrier means arranged concentrically about said drive shaft and said second sleeve member, a third gear secured to said drive shaft, a fourth gear secured to said second sleeve member, third planet pinions meshing with said third gear, fourth planet pinions meshing with said third planet pinions and said fourth gear, said third and fourth planet pinions being carried by said second planet carrier means, second selectively operable electrodynamic brake means for braking said second planet carrier means whereby drive is effected between said drive shaft and said second sleeve member, a driven shaft, and selectively operable change speed gear means between said first and second sleeve members and said driven shaft.

3. The combination of claim 2 wherein said first, second, third and fourth gears have the same pitch diameter and said first, second, third and fourth planet pinions have the same pitch diameter.

4. For use with a prime mover, a torque transmitting device comprising a drive shaft, step-up gearing between the prime mover and said drive shaft whereby the torque at said drive shaft is less than the torque developed by the prime mover, a first sleeve member journaled on said drive shaft, a second sleeve member journaled on said drive shaft, first planet carrier means arranged concentrically about said drive shaft and said first sleeve member, a first gear secured to said drive shaft, a second gear secured to said first sleeve member, first planet pinions meshing with said first gear, second planet pinions meshing with said first planet pinions and said second gear, said first and second planet pinions being carried by said first planet carrier means, first selectively operable electrodynamic brake means for braking said first planet carrier means whereby drive is effected between said drive shaft and said first sleeve member, second planet carrier means arranged concentrically about said drive shaft and said second sleeve member, a third gear secured to said drive shaft, a fourth gear secured to said second sleeve member, third planet pinions meshing with said third gear, fourth planet pinions meshing with said third planet pinions and said fourth gear, said third and fourth planet pinions being carried by said second planet carrier means, second selectively operable electrodynamic brake means for braking said second planet carrier means whereby drive is effected between said drive shaft and said second sleeve member, a driven shaft, and selectively operable change speed gear means between said first and second sleeve members and said driven shaft.

5. In a torque transmitting device, the combination of a drive shaft, a first sleeve member journaled on said drive shaft, a second sleeve member journaled on said drive shaft, first planet carrier means arranged concentrically about said drive shaft and said first sleeve member, first planetary gear means between said drive shaft and said first sleeve member, said first planetary gear means including planet pinion means carried by said first planet carrier means, first selectively operable electrodynamic brake means for braking said first planet carrier means whereby drive is effected between said drive shaft and said first sleeve member, second planet carrier means arranged concentrically about said drive shaft and said second sleeve member, second planetary gear means between said drive shaft and said second sleeve member, said second planetary gear means including planet pinion means carried by said second planet carrier means, second selectively operable electrodynamic brake means for braking said second planet carrier means whereby drive is effected between said drive shaft and said second sleeve member, a first gear secured to said first sleeve member, a second gear secured to said second sleeve member, a countershaft, a first compound gear journaled on said countershaft and having a first gear portion meshing with said first gear, said first compound gear having a second gear portion meshing with a reverse idler gear, said reverse idler gear having meshing engagement with said second gear, an output shaft, and an axially shiftable second compound gear nonrotatably mounted on said output shaft for selective engagement with either gear portion of said first compound gear whereby either one of two drive ratios may be effected to said output shaft the direction of drive being selected by energizing one of said electrodynamic brake means.

6. In a torque transmitting device, the combination of a drive shaft, a first sleeve member journaled on said drive shaft, a second sleeve member journaled on said drive shaft, first planet carrier means arranged concentrically about said drive shaft and said first sleeve member, a first gear secured to said drive shaft, a second gear secured to said first sleeve member, first planet pinions meshing with said first gear, second planet pinions meshing with said first planet pinions and said second gear, said first and second planet pinions being carried by said first planet carrier means, first selectively operable electrodynamic brake means for braking said first planet carrier means whereby drive is effected between said drive shaft and said first sleeve member, second planet carrier means arranged concentrically about said drive shaft and said second sleeve member, a third gear secured to said drive shaft, a fourth gear secured to said second sleeve member, third planet pinions meshing with said third gear, fourth planet pinions meshing with said third planet pinions and said fourth gear, said third and fourth planet pinions being carried by said second planet carrier means, second selectively operable electrodynamic brake means for braking said second planet carrier means whereby drive is effected between said drive shaft and said second sleeve member, a fifth gear secured to said first sleeve member, a sixth gear secured to said second sleeve member, a countershaft, a first compound gear journaled on said countershaft and having a first gear portion meshing with said fifth gear, said first compound gear having a second gear portion meshing with a reverse idler gear, said reverse idler gear meshing with said sixth gear, an output shaft, and an axially movable second compound gear nonrotatably mounted on said output shaft for selective engagement with either of the gear portions of said first compound gear whereby either one of two drive ratios may be effected to said output shaft the direction of drive being selected by energizing one of said electrodynamic brake means.

7. The combination of claim 6 wherein said first, second, third and fourth gears have the same pitch diameter and said first, second, third and fourth planet pinions have the same pitch diameter.

8. For use with a prime mover, a torque transmitting device comprising a drive shaft, step-up gearing between the prime mover and said drive shaft whereby the torque at said drive shaft is less than the torque developed by the prime mover, a first sleeve member journaled on said drive shaft, a second sleeve member journaled on said drive shaft, first planet carrier means arranged concentrically about said drive shaft and said first sleeve member, a first gear secured to said drive shaft, a second gear secured to said first sleeve member, first planet pinions meshing with said first gear, second planet pinions meshing with said first planet pinions and said second gear, said first and second planet pinions being carried by said first planet carrier means, first selectively operable electrodynamic brake means for braking said first planet carrier means whereby drive is effected between said drive shaft and said first sleeve member, second planet carrier means arranged concentrically about said drive shaft and said second sleeve member, a third gear secured to said drive shaft, a fourth gear secured to said second sleeve member, third planet pinions meshing with said third gear, fourth planet pinions meshing with said third planet pinions and said fourth gear, said third and fourth planet pinions being carried by said second planet carrier means, second selectively operable electrodynamic brake means for braking said second planet carrier means whereby drive is effected between said drive shaft and said second sleeve member, a fifth gear secured to said first sleeve member, a sixth gear secured to said second sleeve member, a countershaft, a first compound gear journaled on said countershaft and having a first gear portion meshing with said fifth gear, said first compound gear having a second gear portion meshing with a reverse idler gear, said reverse idler gear meshing with said sixth gear, an output shaft, and an axially shiftable second compound gear member nonrotatably mounted on said output shaft for selective engagement with either one of said gear portions of said first compound gear member whereby said output shaft may be driven in either one of two speeds the direction of drive being selected by energizing one of said electrodynamic brake means.

9. For use with a prime mover, a torque transmitting device comprising a drive shaft, step-up gearing between the prime mover and said drive shaft whereby the torque at said drive shaft is less than the torque developed by the prime mover, a first sleeve member journaled on said drive shaft intermediate of the ends thereof, a first gear secured to said drive shaft, a second gear secured to said first sleeve member adjacent said first gear, a first planet carrier enclosing said first and second gears and having end radial flange members one journaled on said drive shaft and one journaled on said first sleeve member, first planet pinions meshing with said first gear, second planet pinions meshing with said second gear, and said first planet pinions, said first and second planet pinions being carried by said first planet carrier, first selectively operable electrodynamic brake means for braking said first planet carrier whereby drive is effected between said drive shaft and said first sleeve member, a second sleeve member journaled on said drive shaft intermediate the ends thereof, a third gear secured to said drive shaft, a fourth gear secured to said second sleeve member adjacent said third gear, a second planet carrier enclosing said third and fourth gears and having radial end flange members one journaled on said drive shaft and the other journaled on said second sleeve member, third planet pinions meshing with said third gear, fourth planet pinions meshing with said third planet pinions and said fourth gear, said third and fourth planet pinions being carried by said second planet carrier, second selectively operable electrodynamic brake means for braking said second planet carrier whereby drive is effected between said drive shaft and said second sleeve member, a fifth gear secured to said first sleeve member, a sixth gear secured to said second sleeve member, said fifth and sixth gears being arranged intermediate of said first and second planet carriers, a countershaft, a first compound gear journaled on said countershaft and having a first gear portion meshing with said fifth gear, said first compound gear having a second portion meshing with a reverse idler gear, said reverse idler gear meshing with said sixth gear, an output shaft, an axially shiftable second compound gear member nonrotatably mounted on said output shaft, said last-named compound gear member being selectively shiftable into engagement with either gear portion of said first compound gear member whereby either one of two drive ratios may be effected to said output shaft the direction of drive being selected by energizing one of said electrodynamic brake means.

ROBERT LAPSLEY.

References Cited in the file of this patent

UNITED STATES PATENTS

| Number | Name | Date |
|---|---|---|
| 813,461 | Stacks | Feb. 27, 1906 |
| 983,452 | Kirk | Feb. 7, 1911 |
| 2,504,306 | Curtis et al. | Apr. 18, 1950 |

FOREIGN PATENTS

| Number | Country | Date |
|---|---|---|
| 28,431 of 1906 | Great Britain | Oct. 24, 1907 |
| 811,537 | Germany | Aug. 20, 1951 |